(12) United States Patent
Terada et al.

(10) Patent No.: US 10,003,099 B2
(45) Date of Patent: Jun. 19, 2018

(54) FUEL CELL STACK

(71) Applicant: HONDA MOTOR CO., LTD., Tokyo (JP)

(72) Inventors: Eri Terada, Wako (JP); Kentaro Ishida, Wako (JP); Shuhei Goto, Wako (JP); Tsuyoshi Kobayashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 42 days.

(21) Appl. No.: 14/179,561

(22) Filed: Feb. 13, 2014

(65) Prior Publication Data

US 2014/0234742 A1    Aug. 21, 2014

(30) Foreign Application Priority Data

Feb. 18, 2013    (JP) .................................. 2013-028888

(51) Int. Cl.
*H01M 8/24*    (2016.01)
*H01M 8/2483*    (2016.01)
(Continued)

(52) U.S. Cl.
CPC ....... *H01M 8/2483* (2016.02); *H01M 8/0258* (2013.01); *H01M 8/24* (2013.01);
(Continued)

(58) Field of Classification Search
CPC . H01M 8/241; H01M 8/04052; H01M 8/0258
(Continued)

(56) References Cited

U.S. PATENT DOCUMENTS

| 7,767,355 B2 | 8/2010 | Kato et al. |
|---|---|---|
| 7,799,480 B2 | 9/2010 | Nishiyama et al. |
| | (Continued) | |

FOREIGN PATENT DOCUMENTS

| CN | 101677129 | 3/2010 |
|---|---|---|
| CN | 102386432 | 3/2012 |
| | (Continued) | |

OTHER PUBLICATIONS

JP,2005-285402A translation.*
(Continued)

*Primary Examiner* — Jonathan G Leong
*Assistant Examiner* — Victoria H Lynch
(74) *Attorney, Agent, or Firm* — Mori & Ward, LLP

(57) ABSTRACT

A fuel cell stack includes a plurality of power generation units, a reactant gas channel, and a coolant channel. The plurality of power generation units are stacked in a stacking direction to provide a stacked body and each includes a first separator, a first electrolyte electrode assembly, a second separator, a second electrolyte electrode assembly, and a third separator. The first electrolyte electrode assembly is provided on the first separator. The second separator is provided on the first electrolyte electrode assembly. The second electrolyte electrode assembly is provided on the second separator. The first electrolyte electrode assembly and the second electrolyte electrode assembly each include an electrolyte and a pair of electrodes sandwiching the electrolyte therebetween. The third separator is provided on the second electrolyte electrode assembly.

21 Claims, 12 Drawing Sheets

(51) Int. Cl.
*H01M 8/242* (2016.01)
*H01M 8/0258* (2016.01)
H01M 8/0267 (2016.01)
H01M 8/1018 (2016.01)

(52) U.S. Cl.
CPC .......... H01M 8/242 (2013.01); *H01M 8/0267* (2013.01); *H01M 2008/1095* (2013.01)

(58) Field of Classification Search
USPC .................................. 429/456, 469
See application file for complete search history.

(56) References Cited

U.S. PATENT DOCUMENTS

| | | | |
|---|---|---|---|
| 8,574,778 B2 | 11/2013 | Jinba et al. | |
| 2004/0157099 A1* | 8/2004 | Kato | H01M 8/241 429/434 |
| 2007/0207372 A1* | 9/2007 | Kikuchi | H01M 8/0258 429/434 |
| 2010/0068599 A1 | 3/2010 | Furusawa et al. | |
| 2012/0058411 A1* | 3/2012 | Kobayashi et al. | 429/465 |

FOREIGN PATENT DOCUMENTS

| | | | | |
|---|---|---|---|---|
| JP | 2005-285402 A | * | 10/2005 | .............. H01M 8/24 |
| JP | 4727972 B2 | | 6/2006 | |
| JP | 2008-192368 | | 8/2008 | |
| JP | WO 2009051269 A1 | * | 4/2009 | ........ H01M 8/04007 |

OTHER PUBLICATIONS

Chinese Office Action for corresponding CN Application No. 201410050926.1, dated Oct. 10, 2015 (w/ English machine translation).

Chinese Office Action for corresponding CN Application No. 201410050926.1, dated Apr. 15, 2016.

Japanese Office Action for corresponding JP Application No. 2013-028888, dated Aug. 23, 2016 (w/ English machine translation).

* cited by examiner

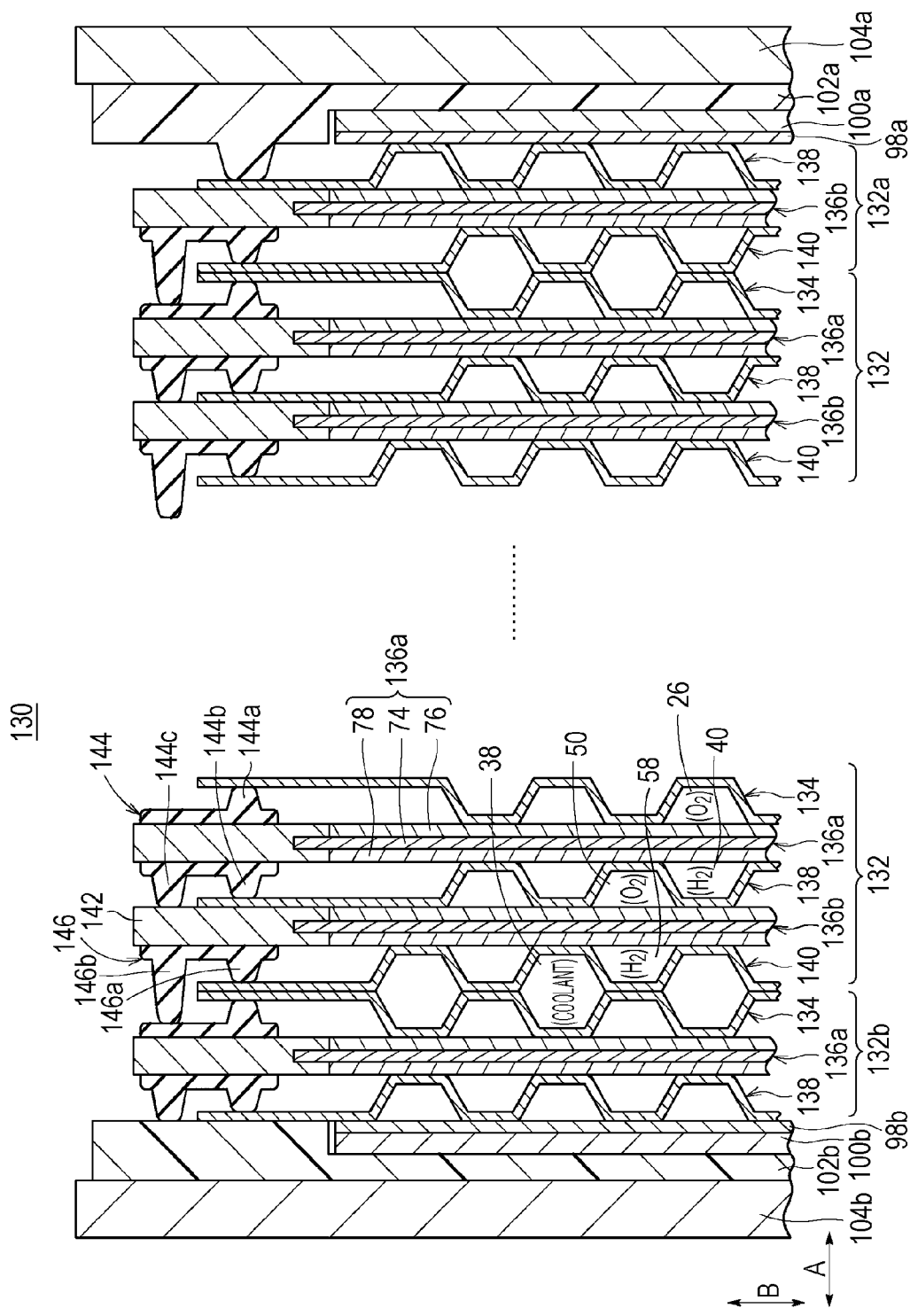

FUEL CELL STACK

CROSS-REFERENCE TO RELATED APPLICATIONS

The present application claims priority under 35 U.S.C. § 119 to Japanese Patent Application No. 2013-028888, filed Feb. 18, 2013, entitled "Fuel Cell Stack." The contents of this application are incorporated herein by reference in their entirety.

BACKGROUND

1. Field

The present disclosure relates to a fuel cell stack.

2. Description of the Related Art

For example, a solid polymer electrolyte fuel cell includes a membrane electrode assembly (MEA) and a pair of separators sandwiching the MEA therebetween. The MEA includes an electrolyte membrane, which is made from a solid polymer ion-exchange membrane, an anode separator disposed on one side of the electrolyte membrane, and a cathode electrode disposed on the other side of the electrolyte membrane. Usually, a plurality of fuel cells are stacked so as to form a fuel cell stack. The fuel cell stack is, for example, mounted on a fuel-cell electric vehicle and used as an automobile fuel cell system.

A fuel cell stack includes a stacked body in which a plurality of fuel cells are stacked; and a terminal plate, an insulator, and an end plate that are stacked at each end of the stacked body in the stacking direction. For example, Japanese Patent No. 4727972 describes a fuel cell stack in which a so-called dummy cell is disposed on at least one end portion of a stacked body in the stacking direction. The dummy cell, which has the same structure as a fuel cell, is disposed between the stacked body and a terminal plate. The dummy cell includes a metal plate instead of an electrolyte membrane and does not generate water because the dummy cell does not generate electric power. Therefore, the dummy cell functions as a heat insulating layer.

A type of fuel cell stack having a skip cooling structure is known. The fuel cell stack includes a plurality of power generation units each including a first separator, a first electrolyte electrode assembly, a second separator, a second electrolyte electrode assembly, and a third separator that are stacked in this order; and a coolant channel through which a coolant flows is only formed in each of spaces between the power generation units.

In the fuel cell stack having a skip cooling structure, the cooling conditions of the first electrolyte electrode assembly and the second electrolyte electrode assembly that are disposed at ends in the stacking direction differ from those of the first electrolyte electrode assembly and the second electrolyte electrode assembly that are disposed in a central portion in the stacking direction. Therefore, the dummy cells, which function as heat insulating layers, are disposed at ends, in the stacking direction, of the fuel cell stack having a skip cooling structure.

SUMMARY

According to one aspect of the present invention, a fuel cell stack includes a plurality of power generation units, a reactant gas channel, and a coolant channel. The plurality of power generation units are stacked in a stacking direction to provide a stacked body and each includes a first separator, a first electrolyte electrode assembly, a second separator, a second electrolyte electrode assembly, and a third separator. The first electrolyte electrode assembly is provided on the first separator. The second separator is provided on the first electrolyte electrode assembly. The second electrolyte electrode assembly is provided on the second separator. The first electrolyte electrode assembly and the second electrolyte electrode assembly each include an electrolyte and a pair of electrodes sandwiching the electrolyte therebetween. The third separator is provided on the second electrolyte electrode assembly. The reactant gas channel through which a reactant gas is to flow along a power generation surface is provided between the first separator and the first electrolyte electrode assembly, between the first electrolyte electrode assembly and the second separator, between the second separator and the second electrolyte electrode assembly, and between the second electrolyte electrode assembly and the third separator. The coolant channel is provided between the plurality of power generation units and through which a coolant is to flow. The stacked body has the second separators at one end and at another end opposite to the one end of the stacked body in the stacking direction, respectively.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 12 is a schematic sectional view of a fuel cell stack according to a second embodiment of the present disclosure.

DESCRIPTION OF THE EMBODIMENTS

Figure 1:
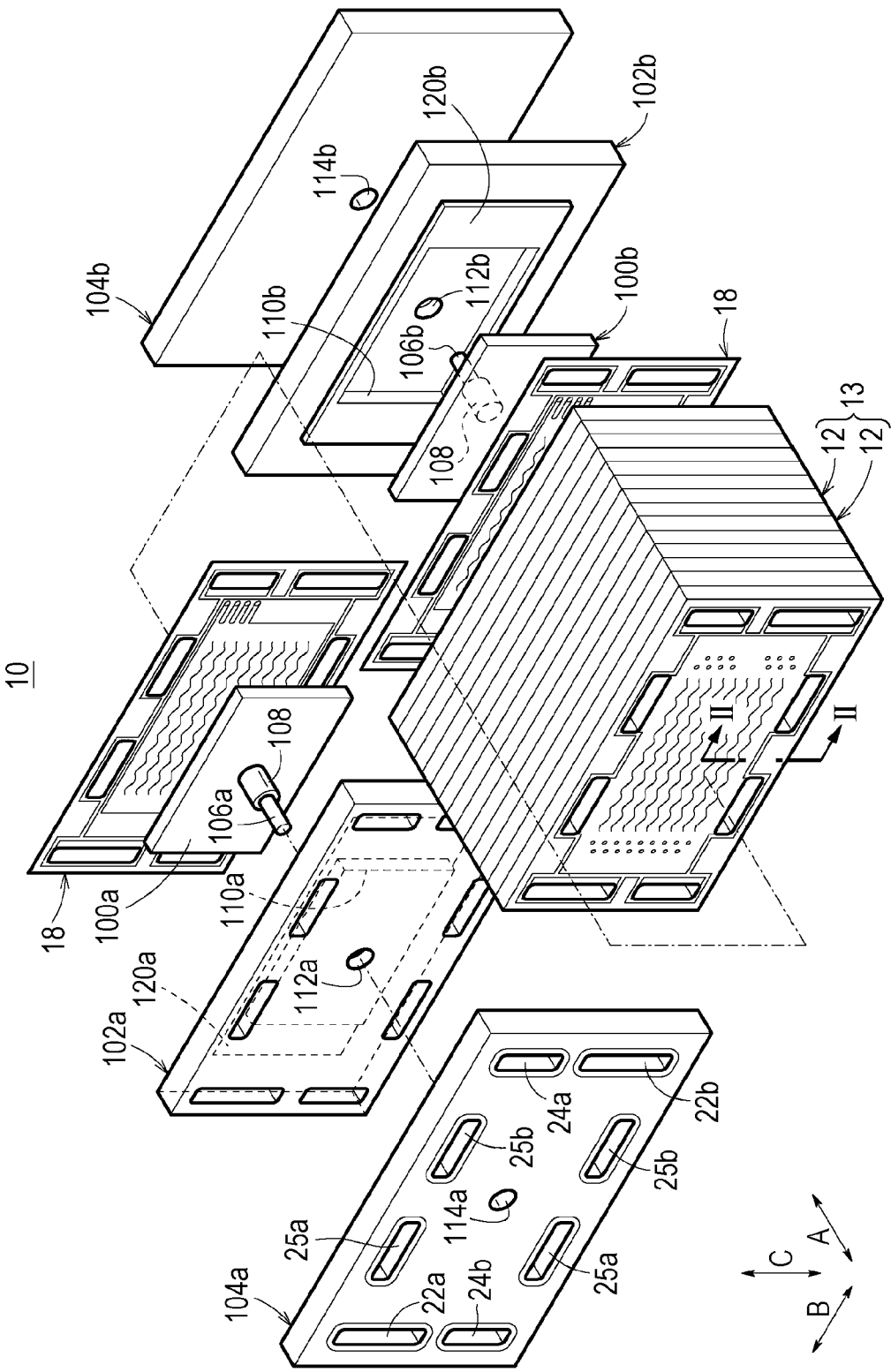
FIG. 1 is a partially exploded schematic perspective view of a fuel cell stack according to a first embodiment of the present disclosure.

The embodiments will now be described with reference to the accompanying drawings, wherein like reference numerals designate corresponding or identical elements throughout the various drawings.

Figure 2:
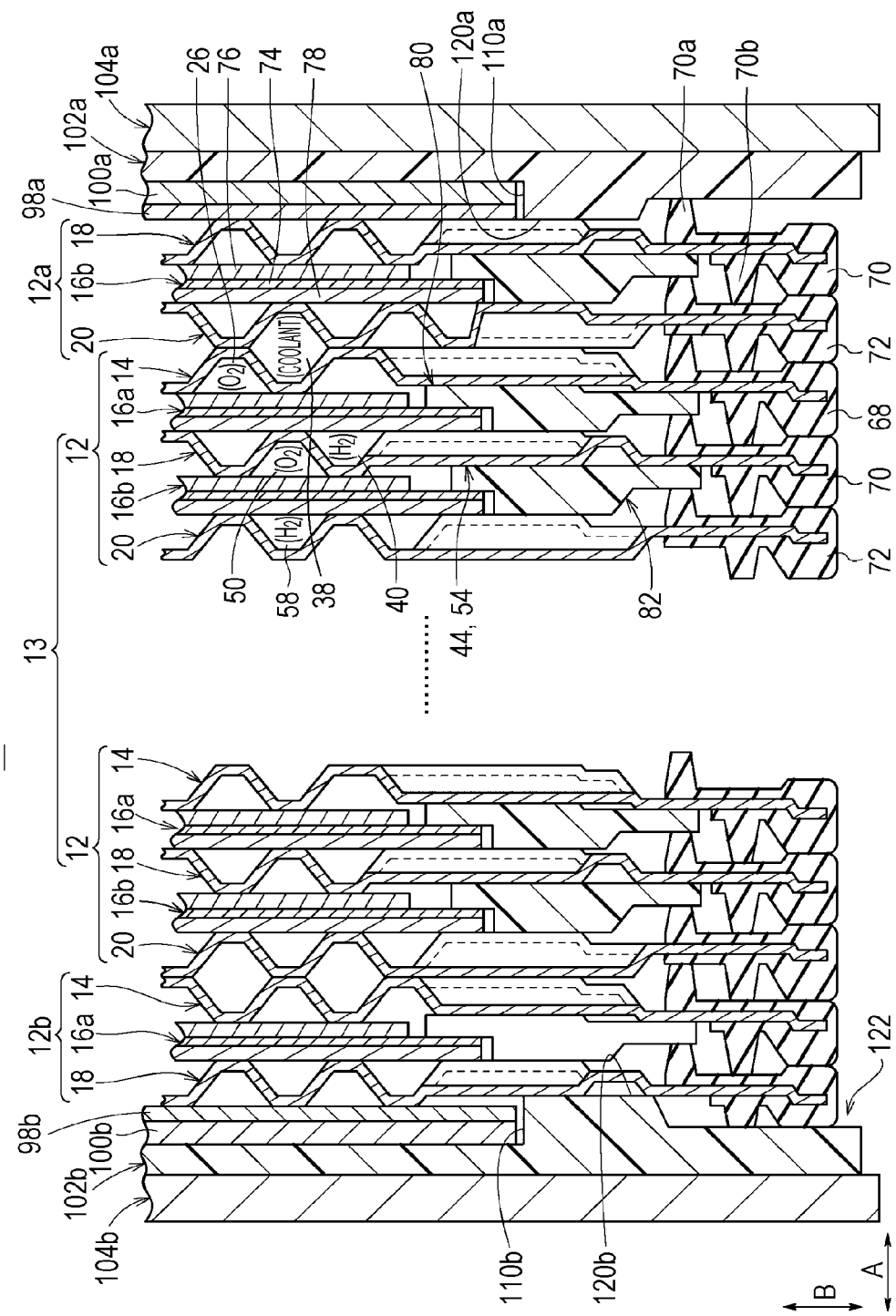
FIG. 2 is a sectional view of the fuel cell stack taken along line II-II of FIG. 1.

As illustrated in FIGS. 1 and 2, a fuel cell stack 10 according to a first embodiment the present disclosure includes a stacked body 13 in which a plurality of power generation units 12 in upright positions are stacked in a horizontal direction (direction of arrow A).

At one end of the stacked body 13 in the stacking direction (direction of arrow A), a terminal plate 100a, an insulator (insulation plate) 102a, and an end plate 104a are stacked outward in this order. At the other end of the stacked body 13 in the stacking direction, a terminal plate 100b, an insulator (insulation plate) 102b, and an end plate 104b are stacked outward in this order.

For example, the fuel cell stack 10 is held in a box casing (not shown) having the end plates 104a and 104b, which are rectangular, as its end plates. Alternatively, the fuel cell stack 10 is integrally fastened by using a plurality of tie rods (not shown) extending in the direction of arrow A.

As illustrated in FIGS. 2 to 5, each of the power generation units 12 includes a first metal separator 14, a first membrane electrode assembly 16a, a second metal separator 18, a second membrane electrode assembly 16b, and a third metal separator 20. The first metal separator 14, the first membrane electrode assembly 16a, the second metal separator 18, the second membrane electrode assembly 16b, and the third metal separator 20 are stacked in a horizontal direction. Electrode surfaces of the first and second membrane electrode assemblies 16a and 16b are in vertical positions and have horizontally-elongated shapes.

The first metal separator 14, the second metal separator 18, and the third metal separator 20 are each made from a horizontally-elongated metal plate, such as a steel plate, a stainless steel plate, an aluminum plate, a galvanized steel plate, or any of such thin metal plates having an anti-corrosive coating on the surface thereof. The first metal separator 14, the second metal separator 18, and the third metal separator 20, which have rectangular shapes in plan view, are formed by press-forming thin metal plates so as to have corrugated cross-sectional shapes. Instead of the metal separators, carbon separators may be used.

Figure 3:
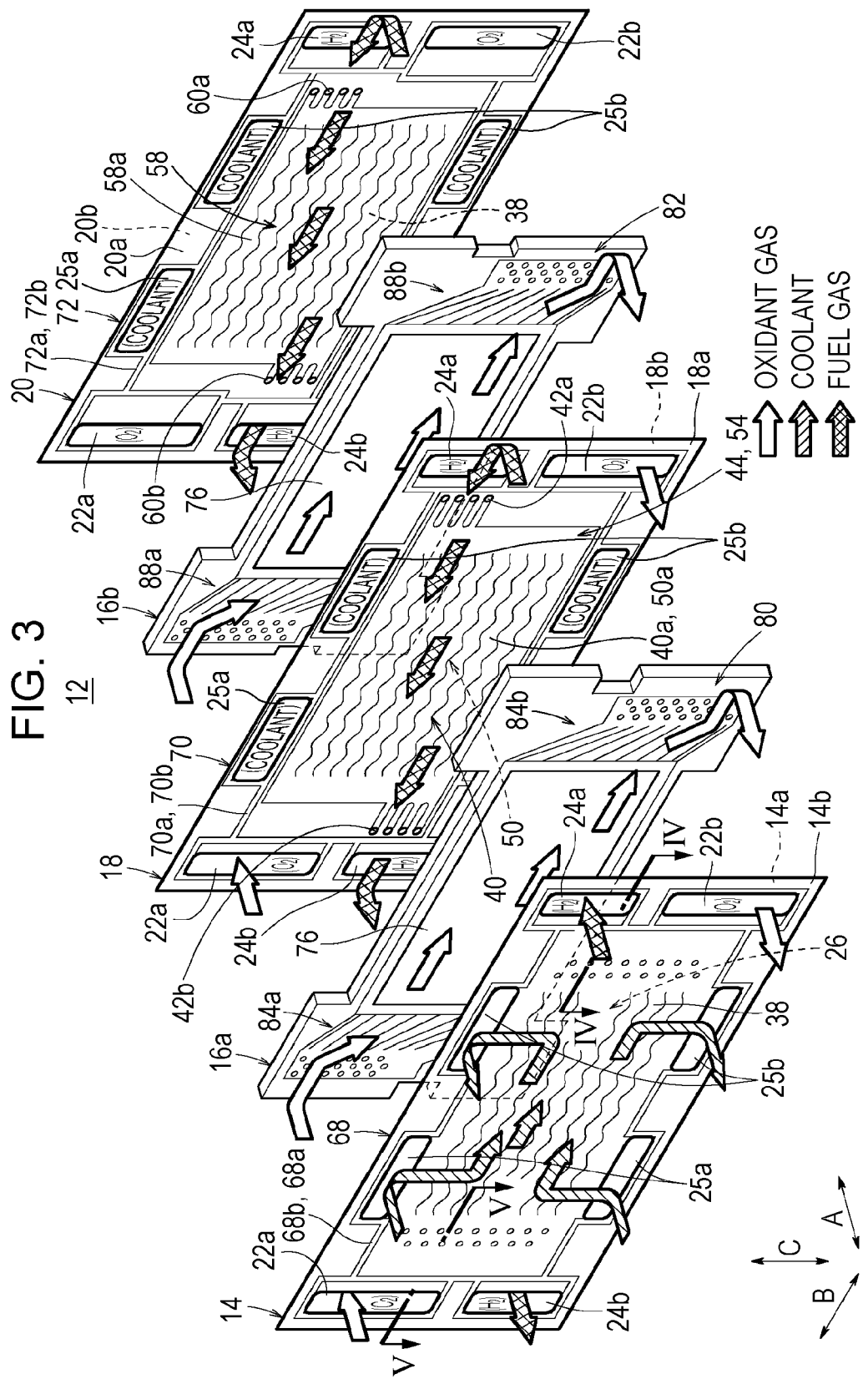
FIG. 3 is a partial exploded perspective view of a power generation unit of the fuel cell stack.

As illustrated in FIG. 3, an oxidant gas inlet manifold 22a and a fuel gas outlet manifold 24b are formed in the power generation unit 12 so as to extend in the direction of arrow A through one end portion of the power generation unit 12 in the longitudinal direction (direction of arrow B), that is, one end portion of each of the first metal separator 14, the second metal separator 18, and the third metal separator 20 in the longitudinal direction. An oxidant gas, such as an oxygen-containing gas, is supplied through the oxidant gas inlet manifold 22a. A fuel gas, such as a hydrogen-containing gas, is discharged through the fuel gas outlet manifold 24b.

A fuel gas inlet manifold 24a and an oxidant gas outlet manifold 22b are formed in the power generation unit 12 so as to extend in the direction of arrow A through the other end portion of the power generation unit 12 in the longitudinal direction (direction of arrow B). The fuel gas is supplied through the fuel gas inlet manifold 24a. The oxidant gas is discharged through the oxidant gas outlet manifold 22b.

A pair of coolant inlet manifolds 25a are formed in the power generation unit 12 so as to extend in the direction of arrow A through end portions of the power generation unit 12 in the transversal direction (direction of arrow C) near the oxidant gas inlet manifold 22a. A coolant is supplied through the pair of coolant inlet manifolds 25a. A pair of coolant outlet manifolds 25b are formed in the power generation unit 12 so as to extend in the direction of arrow A through end portions of the power generation unit 12 in the transversal direction near the fuel gas inlet manifold 24a. The coolant is discharged through the pair of coolant outlet manifolds 25b.

Figure 6:
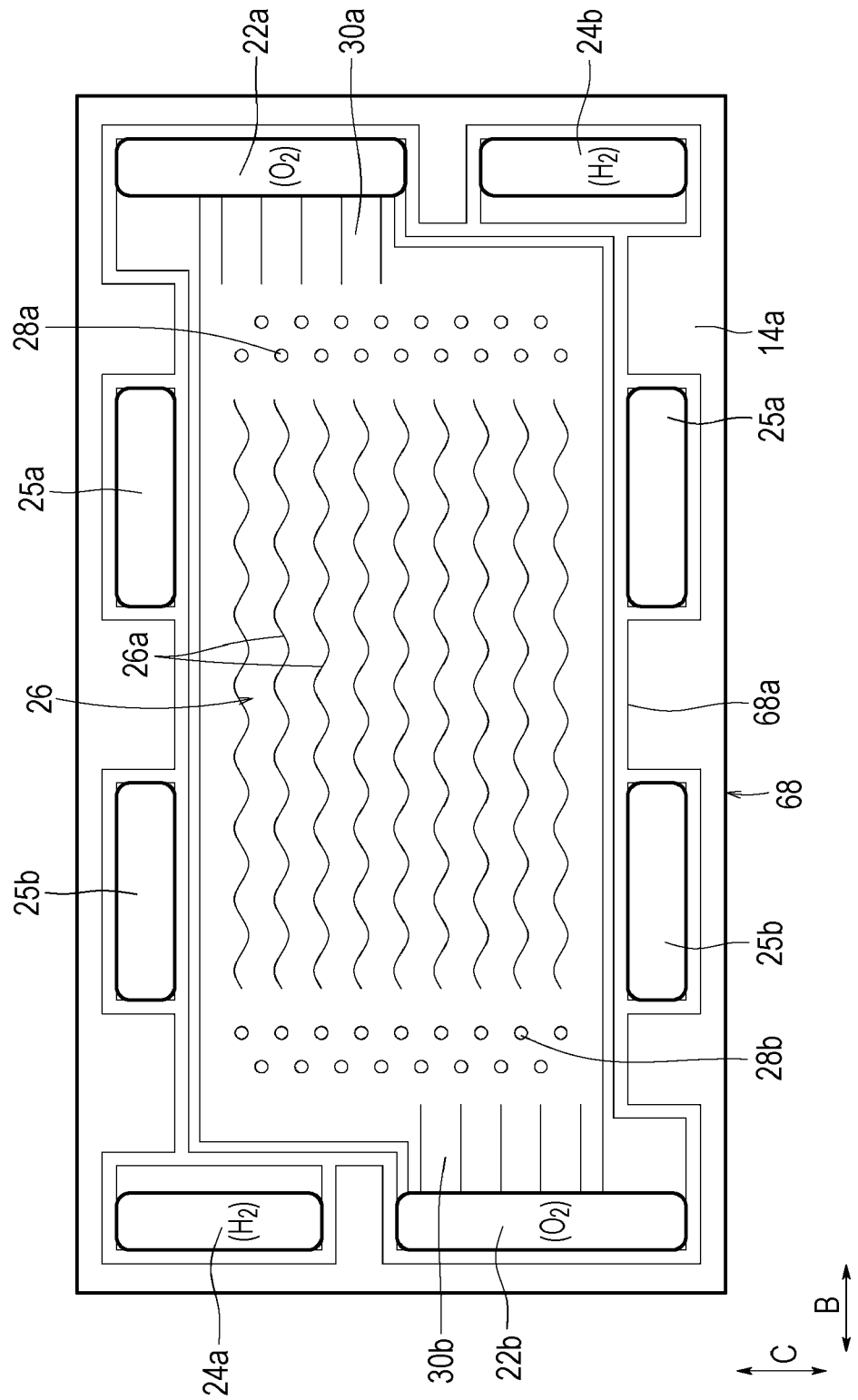
FIG. 6 is a plan view of a first metal separator of the power generation unit.

As illustrated in FIG. 6, a first oxidant gas channel 26, through which the oxidant gas inlet manifold 22a is connected to the oxidant gas outlet manifold 22b, is formed on a surface 14a of the first metal separator 14 facing the first membrane electrode assembly 16a.

The first oxidant gas channel 26 includes a plurality of wave-shaped channel grooves (or linear channel grooves) 26a extending in the direction of arrow B. An inlet embossed portion 28a and an outlet embossed portion 28b are respectively disposed near an inlet and outlet of the first oxidant gas channel 26. The inlet and outlet embossed portions 28a and 28b each have a plurality of column-shaped protrusions protruding toward the first membrane electrode assembly 16a.

A plurality of inlet connection grooves 30a, which constitute a bridge portion, are formed between the inlet embossed portion 28a and the oxidant gas inlet manifold 22a. A plurality of outlet connection grooves 30b, which constitute a bridge portion, are formed between the outlet embossed portion 28b and the oxidant gas outlet manifold 22b.

As illustrated in FIG. 3, a coolant channel 38, through which the coolant inlet manifolds 25a are connected to the coolant outlet manifolds 25b, is formed on a surface 14b of the first metal separator 14. The coolant channel 38 is formed between the back side of the first oxidant gas channel 26 and the back side of a second fuel gas channel 58 (described below).

A first fuel gas channel 40, through which the fuel gas inlet manifold 24a is connected to the fuel gas outlet manifold 24b, is formed on a surface 18a of the second metal separator 18 facing the first membrane electrode assembly 16a. The first fuel gas channel 40 includes a plurality of wave-shaped channel grooves (or linear channel grooves) 40a extending in the direction of arrow B. A plurality of supply holes 42a are formed near the fuel gas inlet manifold 24a. A plurality of discharge holes 42b are formed near the fuel gas outlet manifold 24b.

Figure 7:
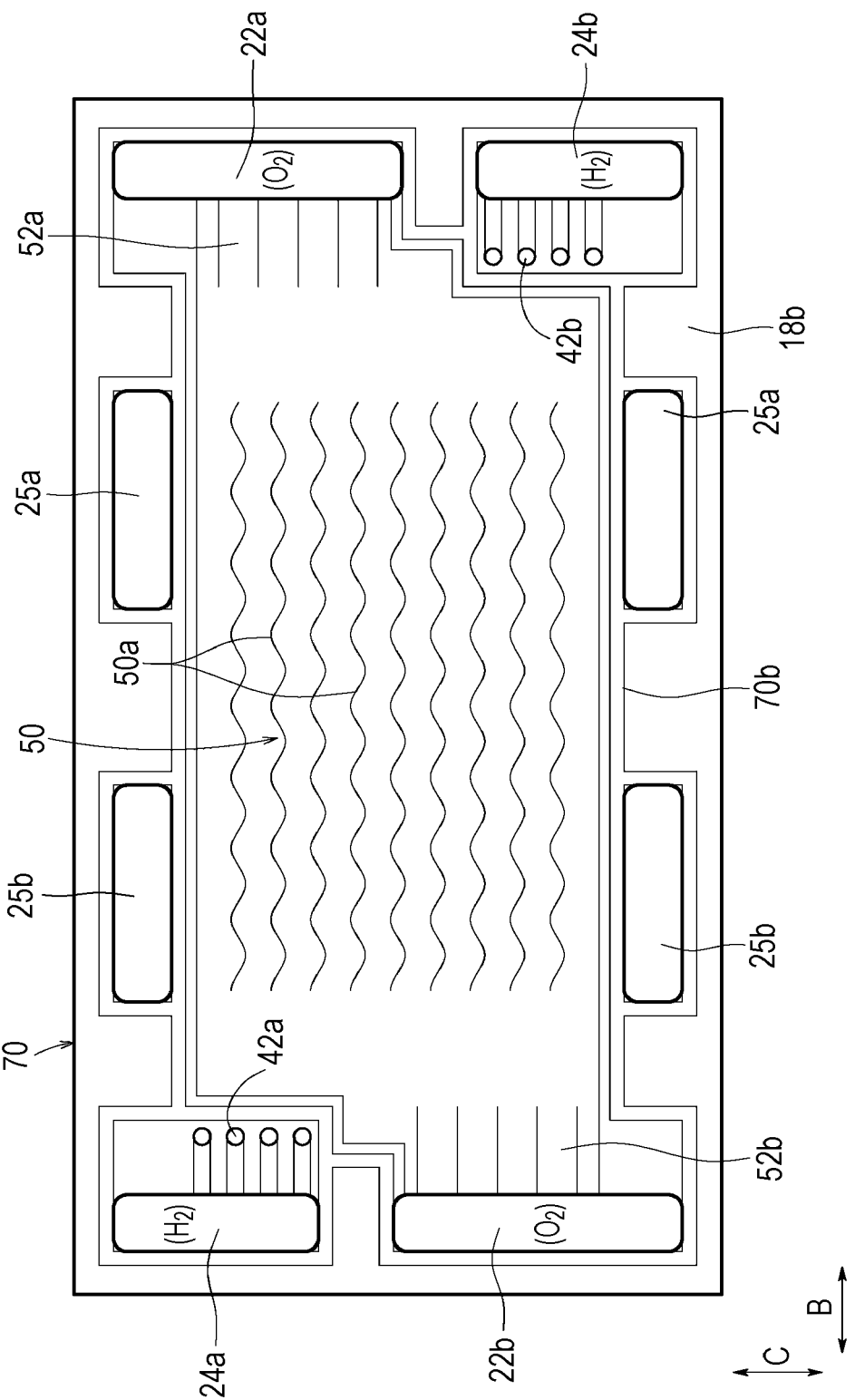
FIG. 7 is a plan view of a second metal separator of the power generation unit.

As illustrated in FIG. 7, a second oxidant gas channel 50, through which the oxidant gas inlet manifold 22a is connected to the oxidant gas outlet manifold 22b, is formed on a surface 18b of the second metal separator 18 facing the second membrane electrode assembly 16b. The second oxidant gas channel 50 includes a plurality of wave-shaped channel grooves (or linear channel grooves) 50a extending in the direction of arrow B. A plurality of inlet connection grooves 52a are formed near the oxidant gas inlet manifold 22a. A plurality of outlet connection grooves 52b are formed near the oxidant gas outlet manifold 22b.

As illustrated in FIG. 3, the second fuel gas channel 58, through which the fuel gas inlet manifold 24a is connected to the fuel gas outlet manifold 24b, is formed on a surface 20a of the third metal separator 20 facing the second membrane electrode assembly 16b. The second fuel gas channel 58 includes a plurality of wave-shaped channel grooves (or linear channel grooves) 58a extending in the direction of arrow B.

Figure 4:
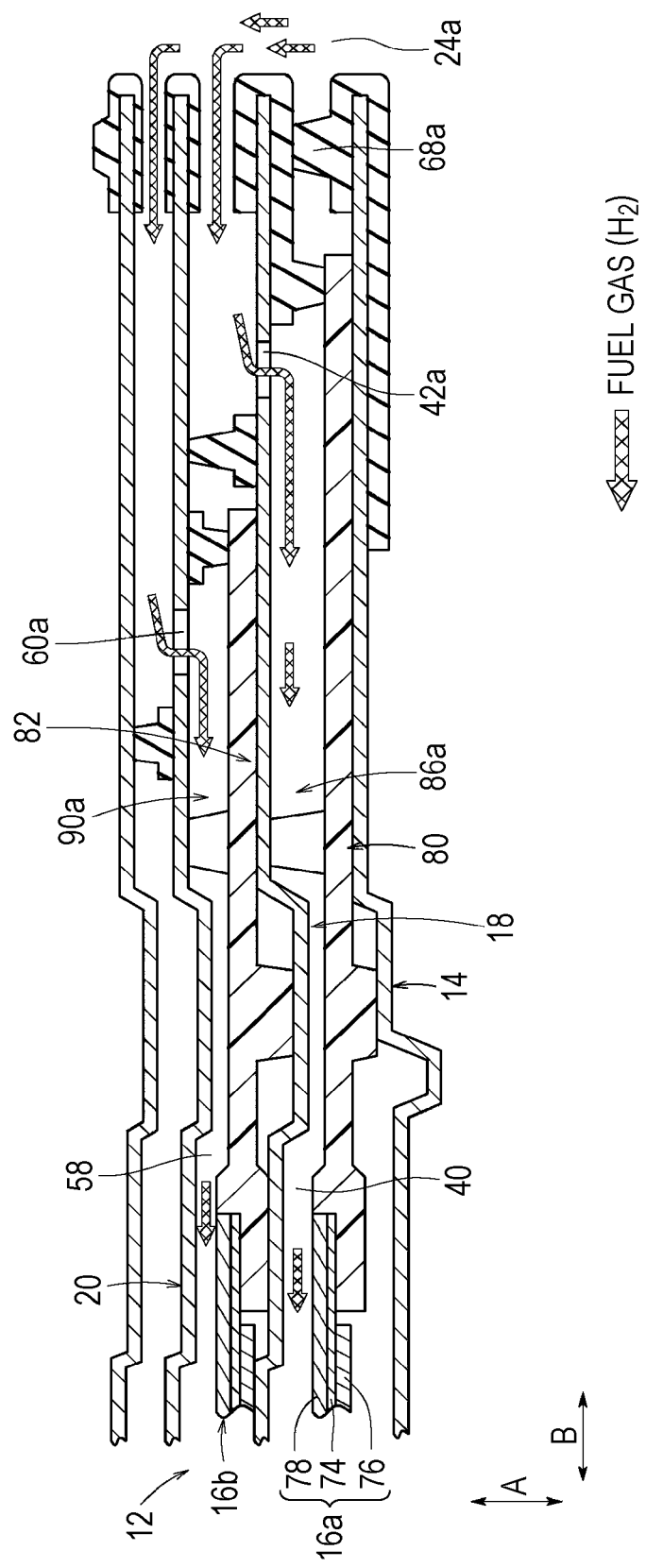
FIG. 4 is a sectional view the power generation unit taken along line IV-IV of FIG. 3.

A plurality of supply holes 60a are formed near the fuel gas inlet manifold 24a. A plurality of discharge holes 60b are formed near the fuel gas outlet manifold 24b. As illustrated in FIGS. 3 and 4, the supply holes 60a are disposed inward from the supply holes 42a of the second metal separator 18 (nearer to the fuel gas channel). The discharge holes 60b are disposed inward from the discharge holes 42b of the second metal separator 18 (nearer to the fuel gas channel).

A part of the coolant channel 38 is formed on a surface 20b of the third metal separator 20, which is the back side of the second fuel gas channel 58. The coolant channel 38 is formed between the surface 20b of the third metal separator 20 and the surface 14b of the first metal separator 14 that is disposed adjacent to the third metal separator 20.

A first sealing member 68 is integrally formed on the surfaces 14a and 14b of the first metal separator 14 so as to surround the outer periphery of the first metal separator 14. A second sealing member 70 is integrally formed on the surfaces 18a and 18b of the second metal separator 18 so as to surround the outer periphery of the second metal separator 18. A third sealing member 72 is integrally formed on the surfaces 20a and 20b of the third metal separator 20 so as to surround the outer periphery of the third metal separator 20.

Each of the first sealing member 68, the second sealing member 70, and the third sealing member 72 is made from an elastic material such as a sealing material, a cushioning material, or a packing material. Examples of such materials include EPDM, NBR, fluorocarbon rubber, silicone rubber, fluorosilicone rubber, butyl rubber, natural rubber, styrene rubber, chloroprene-rubber, and acrylic rubber.

As illustrated in FIG. 6, the first sealing member 68 includes a first protruding sealing portion 68a on the surface 14a of the first metal separator 14. The first protruding sealing portion 68a connects the outer peripheries of the oxidant gas inlet manifold 22a, the oxidant gas outlet manifold 22b, and the first oxidant gas channel 26. As illustrated in FIG. 3, the first sealing member 68 includes a second protruding sealing portion 68b on the surface 14b of the first metal separator 14. The second protruding sealing portion 68b connects the outer peripheries of the coolant inlet manifolds 25a, the coolant outlet manifolds 25b, and the coolant channel 38.

As illustrated in FIG. 3, the second sealing member 70 includes a first protruding sealing portion 70a on the surface 18a of the second metal separator 18. The first protruding sealing portion 70a surrounds the supply holes 42a, the discharge holes 42b, and the first fuel gas channel 40 so that they are connected to each other.

As illustrated in FIG. 7, the second sealing member 70 includes a second protruding sealing portion 70b on the surface 18b of the second metal separator 18. The second protruding sealing portion 70b connects the outer peripheries of the oxidant gas inlet manifold 22a, the oxidant gas outlet manifold 22b, and the second oxidant gas channel 50.

As illustrated in FIG. 3, the third sealing member 72 includes a first protruding sealing portion 72a on the surface 20a of the third metal separator 20. The first protruding sealing portion 72a surrounds the supply holes 60a, the discharge holes 60b, and the second fuel gas channel 58 so that they are connected to each other.

The third sealing member 72 includes a second protruding sealing portion 72b on the surface 20b of the third metal separator 20. The second protruding sealing portion 72b connects the outer peripheries of the coolant inlet manifolds 25a, the coolant outlet manifolds 25b, and the coolant channel 38.

As illustrated in FIG. 2, the first membrane electrode assembly 16a and the second membrane electrode assembly 16b each include a solid polymer electrolyte membrane 74, and a cathode electrode 76 and an anode electrode 78 sandwiching the solid polymer electrolyte membrane 74 therebetween. The solid polymer electrolyte membrane 74 is, for example, a thin film that is made of a perfluorosulfonate polymer and that is impregnated with water. Each of the first and second membrane electrode assemblies 16a and 16b is a stepped MEA, in which the cathode electrode 76 has planar dimensions smaller than those of the anode electrode 78 and the solid polymer electrolyte membrane 74. Alternatively, the cathode electrode 76, the anode electrode 78, and the solid polymer electrolyte membrane 74 may have the same planar dimensions. Further alternatively, the anode electrode 78 may have planar dimensions smaller than those of the cathode electrode 76 and the solid polymer electrolyte membrane 74.

The cathode electrode 76 and the anode electrode 78 each include a gas diffusion layer (not shown) and an electrode catalyst layer (not shown). The gas diffusion layer is made of carbon paper or the like. The electrode catalyst layer is formed on a surface of the gas diffusion layer by uniformly coating the surface with porous carbon particles whose surfaces support a platinum alloy. The electrode catalyst layers are disposed on both sides of the solid polymer electrolyte membrane 74.

The first membrane electrode assembly 16a includes a first resin frame member 80 that is disposed outward from an end of the cathode electrode 76 on the outer periphery of the solid polymer electrolyte membrane 74. The first resin frame member 80 is integrally formed by, for example, injection molding or the like. The second membrane electrode assembly 16b includes a second resin frame member 82 that is disposed outward from an end of the cathode electrode 76 on the outer periphery of the solid polymer electrolyte membrane 74. The second resin frame member 82 is integrally formed by, for example, injection molding or the like. The first resin frame member 80 and the second resin frame member 82 are each made of a resin material, such as a commodity plastic, an engineering plastic, or a super engineering plastic.

As illustrated in FIG. 3, on a surface of the first resin frame member 80 facing the cathode electrode 76, an inlet buffer portion 84a is disposed between the oxidant gas inlet manifold 22a and the inlet of the first oxidant gas channel 26. An outlet buffer portion 84b is disposed between the oxidant gas outlet manifold 22b and the outlet of the first oxidant gas channel 26. The inlet buffer portion 84a and the outlet buffer portion 84b each include a plurality of protrusions and a plurality of linear channels. The same applies to other buffer portions described below.

Figure 8:
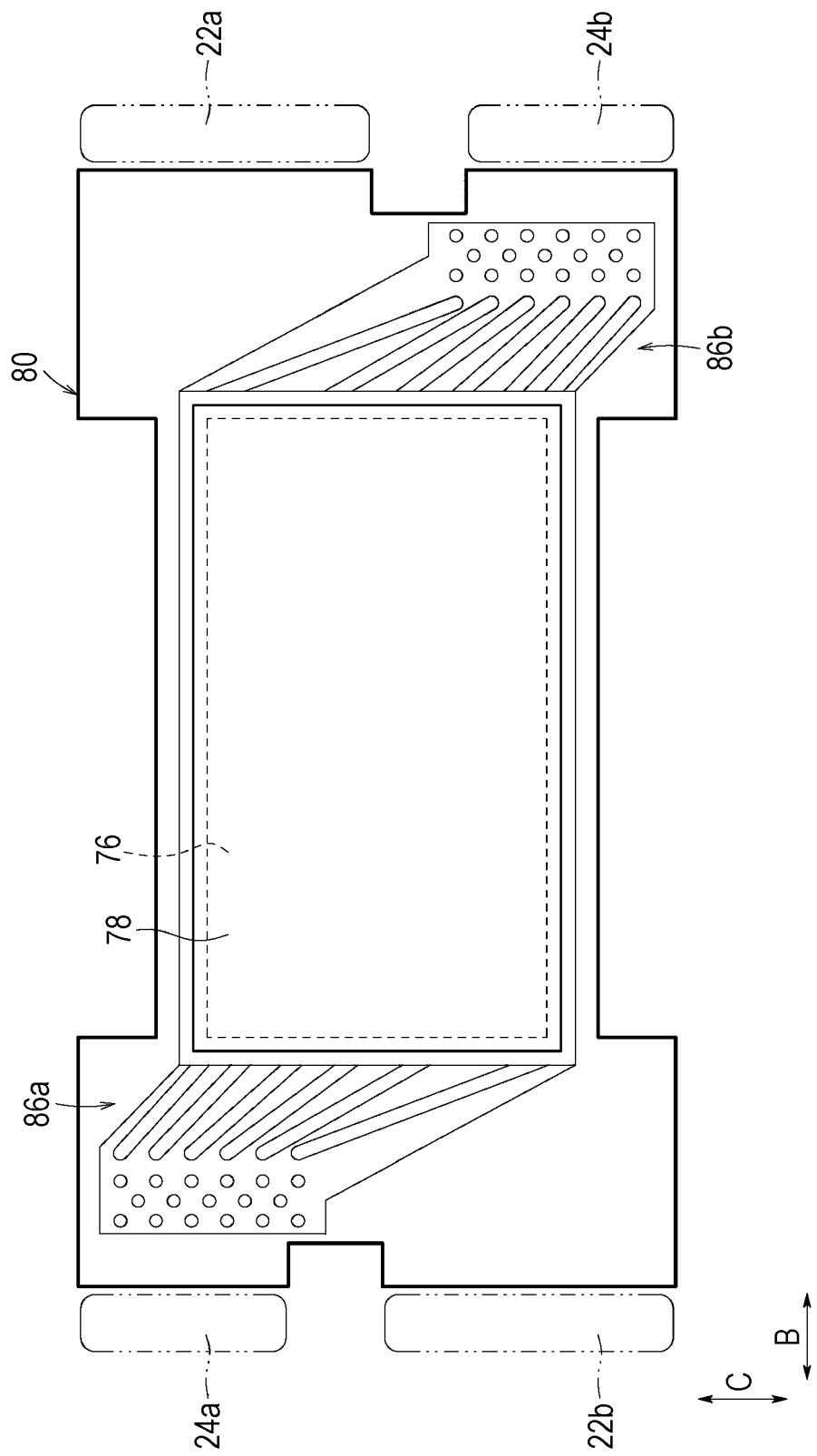
FIG. 8 illustrates one of the surfaces of a first membrane electrode assembly of the power generation unit.

As illustrated in FIG. 8, on a surface of the first resin frame member 80 on the anode electrode 78 side, an inlet buffer portion 86a is disposed between the fuel gas inlet manifold 24a and the first fuel gas channel 40. An outlet buffer portion 86b is disposed between the fuel gas outlet manifold 24b and the first fuel gas channel 40.

As illustrated in FIG. 3, on a surface of the second resin frame member 82 of the second membrane electrode assembly 16b on the cathode electrode 76, an inlet buffer portion 88a is disposed between the oxidant gas inlet manifold 22a and the second oxidant gas channel 50. An outlet buffer portion 88b is disposed between the oxidant gas outlet manifold 22b and the second oxidant gas channel 50.

Figure 9:
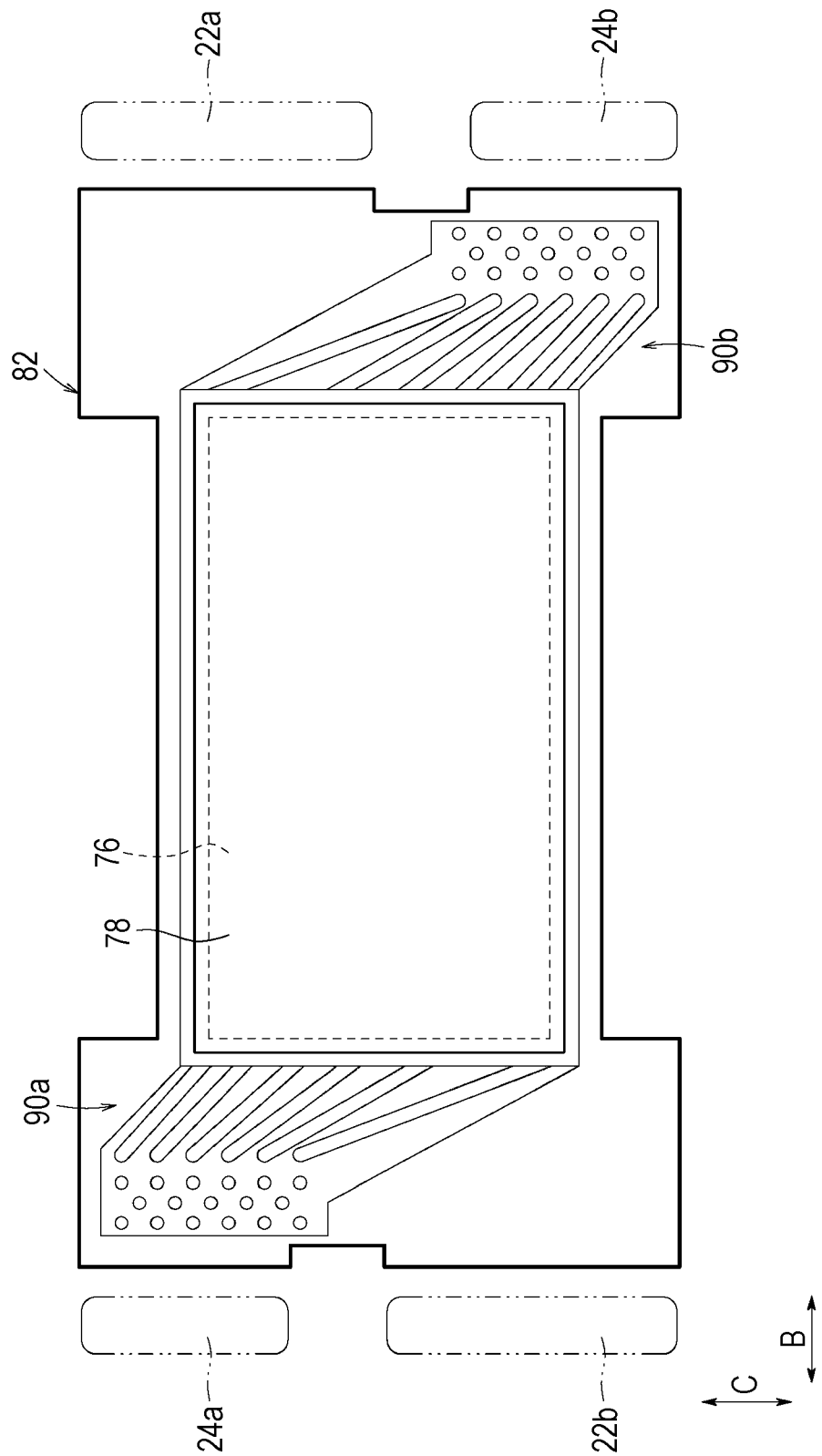
FIG. 9 illustrates one of the surfaces of a second membrane electrode assembly of the power generation unit.

As illustrated in FIG. 9, on a surface of the second resin frame member 82 on the anode electrode 78 side, an inlet buffer portion 90a is disposed between the fuel gas inlet manifold 24a and the second fuel gas channel 58. An outlet buffer portion 90b is disposed between the fuel gas outlet manifold 24b and the second fuel gas channel 58.

When two power generation units 12 are stacked each other, the coolant channel 38 is formed between the first metal separator 14 of one of the power generation units 12 and the third metal separator 20 of the other power generation unit 12.

As illustrated in FIGS. 1 and 2, the second metal separator 18 as an end separator is disposed at each end of the stacked body 13 in the stacking direction. As illustrated in FIG. 2, a first end power generation unit 12a is disposed at one end of the power generation units 12 in the stacking direction. The first end power generation unit 12a includes the third metal separator 20, the second membrane electrode assembly 16b, and the second metal separator 18 that are stacked outward. A second end power generation unit 12b is disposed at the other end of the power generation units 12 in the stacking direction. The second end power generation unit 12b includes the first metal separator 14, the first membrane electrode assembly 16a, and the second metal separator 18 that are stacked outward.

On the second metal separator 18 of the first end power generation unit 12a, a heat insulating layer 98a, the terminal plate 100a, the insulator (insulation plate) 102a, and the end plate 104a are stacked outward in the stacking direction. On the second metal separator 18 of the second end power generation unit 12b, a heat insulating layer 98b, the terminal plate 100b, the insulator (insulation plate) 102b, and the end plate 104b are stacked outward in the stacking direction. The heat insulating layers 98a and 98b are each made of an electrically conducting porous material. The heat insulating layers 98a and 98b, which have a heat insulating effect, are each made from, for example, a porous metal material, a stack of corrugated thin metal plates, or a honeycomb metal. One of the heat insulating layers 98a and 98b may be omitted.

As illustrated in FIG. 1, terminal portions 106a and 106b are respectively disposed at substantially the centers of the terminal plates 100a and 100b. The terminal portions 106a and 106b extend outward in the stacking direction. The terminal portions 106a and 106b are respectively inserted into cylindrical insulators 108 so as to protrude to the outside of the end plates 104a and 104b. The insulators 102a and 102b are each made of an insulating material, such as a polycarbonate (PC) or a phenol resin. The insulators 102a and 102b may have inner spaces for heat insulation.

The insulators 102a and 102b respectively include rectangular recessed portions 110a and 110b in middle portions thereof. Holes 112a and 112b are formed at substantially the centers of the recessed portions 110a and 110b. The terminal plates 100a and 100b are disposed in the recessed portions 110a and 110b. The terminal portions 106a and 106b of the terminal plates 100a and 100b are respectively inserted into the holes 112a and 112b with the cylindrical insulators 108 therebetween.

Holes 114a and 114b are respectively formed at substantially the centers of the end plates 104a and 104b so as to be coaxial with the holes 112a and 112b. In the end plate 104a, the oxidant gas inlet manifold 22a, the fuel gas inlet manifold 24a, the pair of coolant inlet manifolds 25a, the oxidant gas outlet manifold 22b, the fuel gas outlet manifold 24b, and the pair of coolant outlet manifolds 25b are formed. The outer peripheries of the terminal plates 100a and 100b are located inward from the oxidant gas inlet manifold 22a, the fuel gas inlet manifold 24a, the coolant inlet manifolds 25a, the oxidant gas outlet manifold 22b, the fuel gas outlet manifold 24b and the coolant outlet manifolds 25b.

For example, a protruding portion 120a is formed on an outer peripheral portion of a surface of the insulator 102a that is in contact with the second metal separator 18 so as to correspond to the protruding/recessed shape of the surface 18a of the second metal separator 18. For example, a protruding portion 120b is formed on an outer peripheral portion of a surface of the insulator 102b that is in contact with the second metal separator 18 so as to correspond to the protruding/recessed shape of the surface 18b of the second metal separator 18.

The operation of the fuel cell stack 10 will be described below.

First, as illustrated in FIG. 1, an oxidant gas, such as an oxygen-containing gas, is supplied to the oxidant gas inlet manifold 22a through the end plate 104a. A fuel gas, such as a hydrogen-containing gas, is supplied to the fuel gas inlet manifold 24a through the end plate 104a. A coolant, such as pure water, ethylene glycol, an oil, or the like, is supplied to the pair of coolant inlet manifolds 25a.

Figure 5:
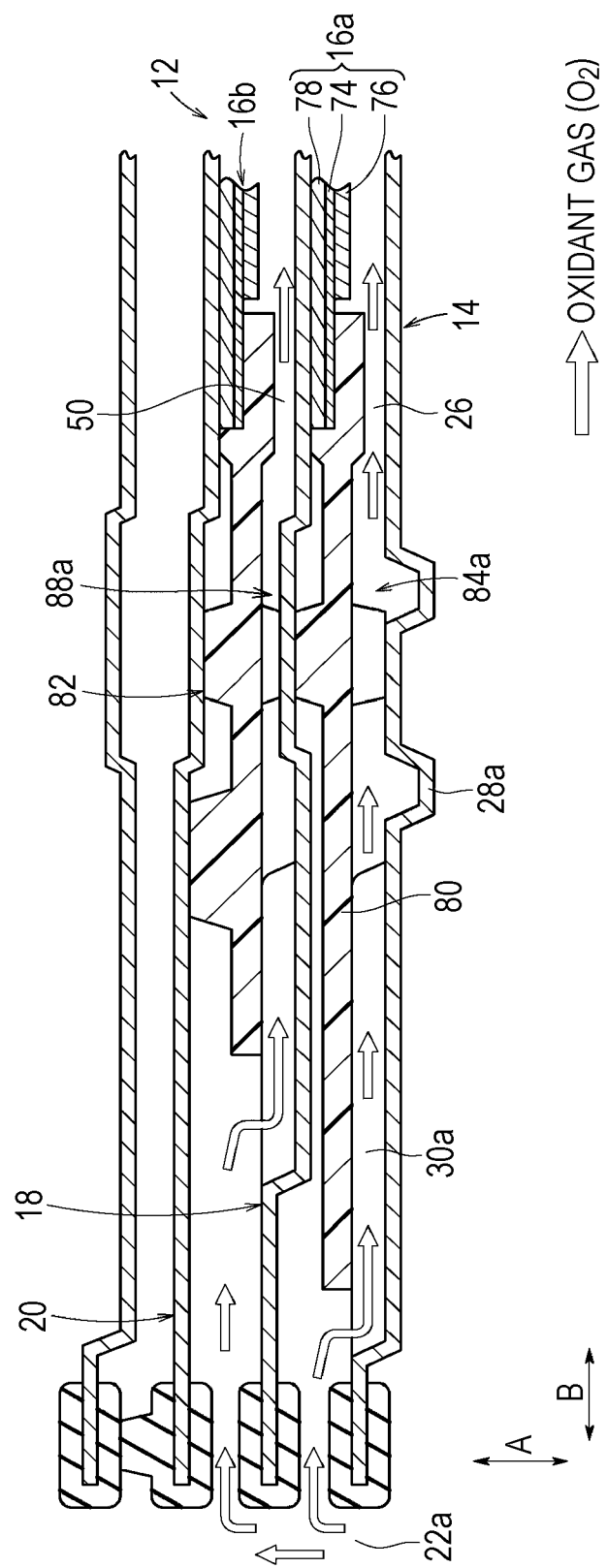
FIG. 5 is a sectional view the power generation unit taken along line V-V of FIG. 3.

As illustrated in FIGS. 3 and 5, the oxidant gas flows from the oxidant gas inlet manifold 22a, through the inlet buffer portion 84a, and to the first oxidant gas channel 26 of the first metal separator 14. Moreover, the oxidant gas flows from the oxidant gas inlet manifold 22a, through the inlet buffer portion 88a, and to the second oxidant gas channel 50 of the second metal separator 18.

The oxidant gas moves along the first oxidant gas channel 26 in the direction of arrow B (horizontal direction), and is supplied to the cathode electrode 76 of the first membrane electrode assembly 16a. Moreover, the oxidant gas moves along the second oxidant gas channel 50 in the direction of arrow B, and is supplied to the cathode electrode 76 of the second membrane electrode assembly 16b.

As illustrated in FIGS. 3 and 4, the fuel gas flows from the fuel gas inlet manifold 24a, through the supply holes 42a, and to the inlet buffer portion 86a. Then, the fuel gas flows from the inlet buffer portion 86a to the first fuel gas channel 40 of the second metal separator 18. Moreover, the fuel gas flows from the fuel gas inlet manifold 24a, through the supply holes 60a, and to the inlet buffer portion 90a. Then, the fuel gas is supplied from the inlet buffer portion 90a to the second fuel gas channel 58 of the third metal separator 20.

The fuel gas flows along the first fuel gas channel 40 in the direction of arrow B, and is supplied to the anode electrode 78 of the first membrane electrode assembly 16a. Moreover, the fuel gas flows along the second fuel gas channel 58 in the direction of arrow B, and is supplied to the anode electrode 78 of the second membrane electrode assembly 16b.

Accordingly, in each of the first membrane electrode assembly 16a and second membrane electrode assembly 16b, the oxidant gas supplied to the cathode electrode 76 and the fuel gas supplied to the anode electrode 78 are consumed in electrochemical reactions in the electrode catalyst layers, and thereby electric power is generated.

Next, the oxidant gas, which has been supplied to the cathode electrodes 76 of the first membrane electrode assembly 16a and the second membrane electrode assembly 16b and consumed, is discharged through the outlet buffer portions 84b and 88b to the oxidant gas outlet manifold 22b (see FIG. 3).

The fuel gas, which has been supplied to the anode electrodes 78 of the first membrane electrode assembly 16a and the second membrane electrode assembly 16b and consumed, is discharged through the outlet buffer portions 86b and 90b and the discharge holes 42b and 60b to the fuel gas outlet manifold 24b.

As illustrated in FIG. 3, the coolant supplied to the pair of coolant inlet manifolds 25a flows through the coolant inlet manifolds 25a to the coolant channel 38. The coolant temporarily flows inward in the direction of arrow then flows in the direction of arrow B, and cools the first membrane electrode assembly 16a and the second membrane electrode assembly 16b. Then, the coolant flows outward in the direction of arrow C, and is discharged to the pair of coolant outlet manifolds 25b.

In the first embodiment, as illustrated in FIG. 2, the first end power generation unit 12a is disposed at one end of the power generation units 12 in the stacking direction. The first end power generation unit 12a includes the third metal separator 20, the second membrane electrode assembly 16b, and the second metal separator 18 that are stacked outward. The second end power generation unit 12b is disposed at the other end of the power generation units 12 in the stacking direction. The second end power generation unit 12b includes the first metal separator 14, the first membrane electrode assembly 16a, and the second metal separator 18 that are stacked outward.

Figure 10:
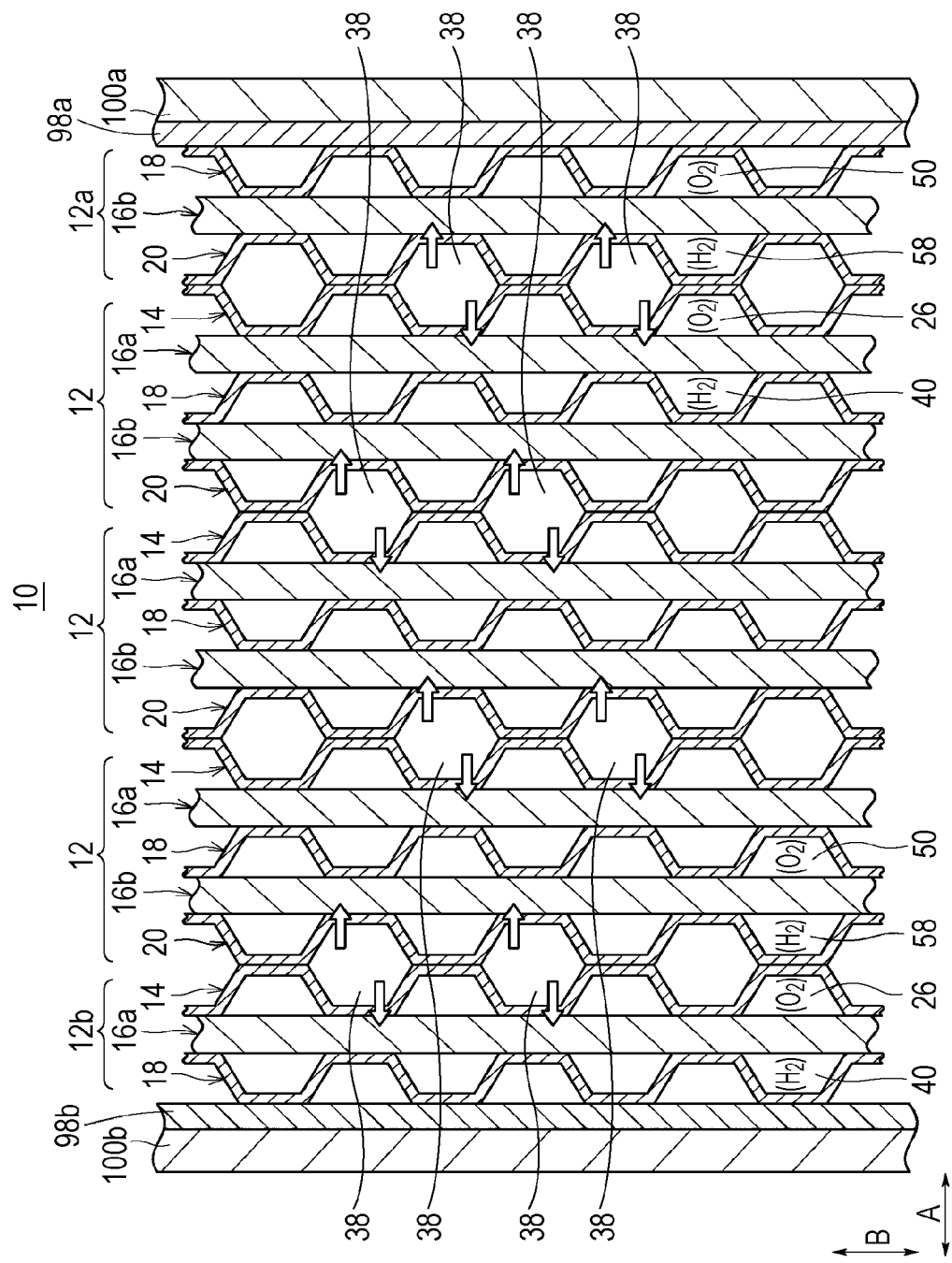
FIG. 10 is a schematic sectional view illustrating a cooling structure of a fuel cell stack.

Therefore, as illustrated in FIG. 10, the coolant channel 38 is formed between the first end power generation unit 12a and an adjacent power generation unit 12. The coolant supplied to this coolant channel 38 cools the second membrane electrode assembly 16b of the first end power generation unit 12a and the first membrane electrode assembly 16a of the adjacent power generation unit 12.

The coolant channel 38 is formed between the second end power generation unit 12b and an adjacent power generation unit 12. The coolant supplied to this coolant channel 38 cools the first membrane electrode assembly 16a of the second end power generation unit 12b and the second membrane electrode assembly 16b of the adjacent power generation unit 12.

Accordingly, the coolant flowing through these coolant channels 38 can cool the first membrane electrode assemblies 16a and the second membrane electrode assemblies 16b, which are located on both sides of the coolant channels 38, of the power generation units 12, the first end power generation unit 12a, and the second end power generation unit 12b.

Figure 11:
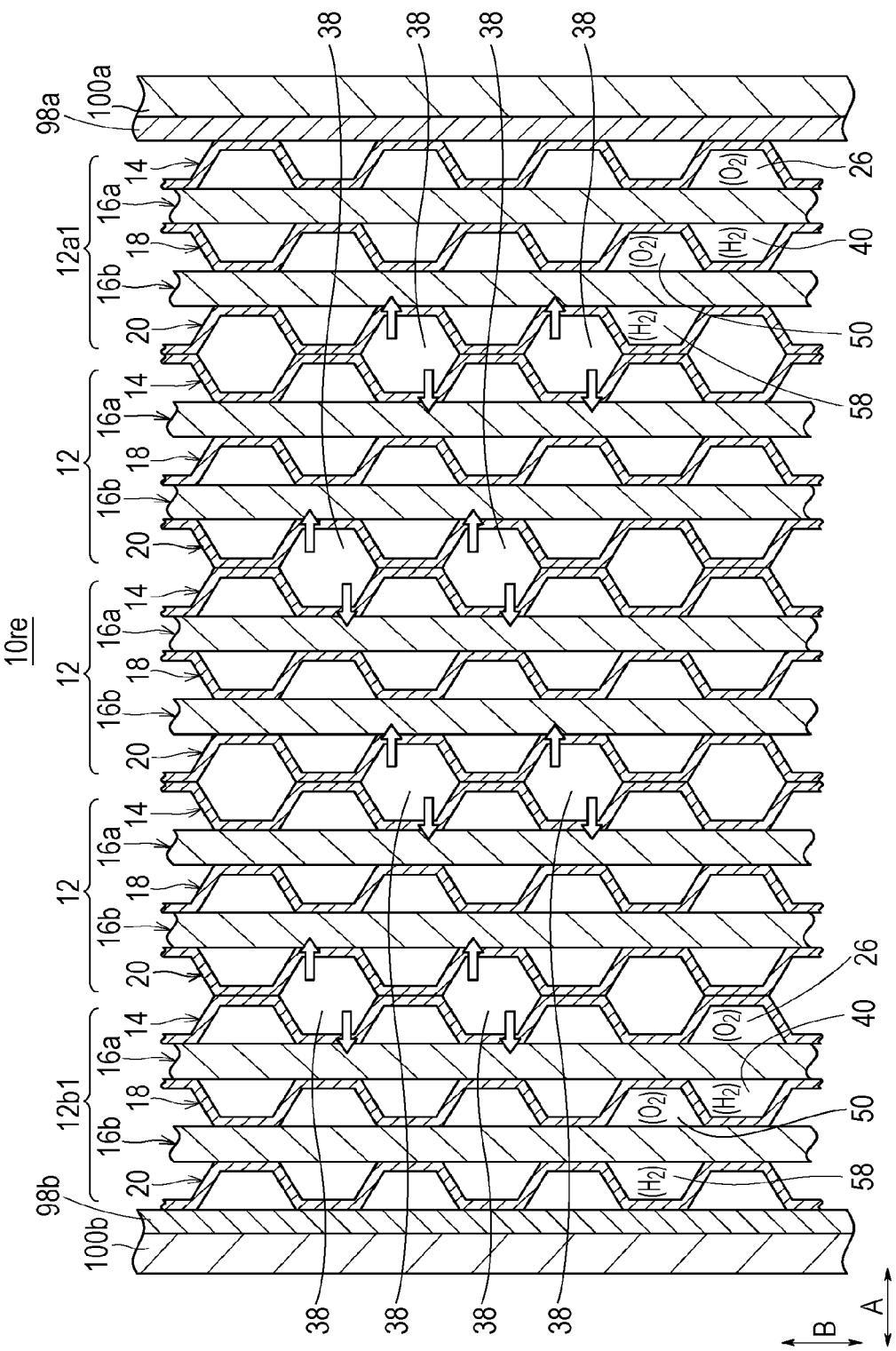
FIG. 11 is a schematic sectional view illustrating a cooling structure of a fuel cell stack according to a comparative example.

FIG. 11 is a schematic sectional view of a fuel cell stack 10re in which a first end power generation unit 12a1 and an second end power generation unit 12b1, each of which is the same as the power generation unit 12, are disposed at ends of the stacked body 13 in the stacking direction.

In the fuel cell stack 10re, the first membrane electrode assembly 16a of the first end power generation unit 12a1 and the second membrane electrode assembly 16b of the second end power generation unit 12b1 are disposed farther from the coolant channels 38 than other first membrane electrode assemblies 16a and other second membrane electrode assemblies 16b are. Thus, the cooling conditions of the first end power generation unit 12a1 and the second end power generation unit 12b1 differ from those of the power generation units 12, and therefore the first and second end power generation units 12a1 and 12b1 cannot be cooled uniformly with the power generation units 12.

In contrast, with the first embodiment, as illustrated in FIG. 10, the power generation units 12, the first end power generation unit 12a, and the second end power generation unit 12b of the fuel cell stack 10 are cooled uniformly. Therefore, the first embodiment has an advantage in that cooling can be performed under optimal conditions without the need of a dummy cell and with a compact and economical structure.

As illustrated in FIG. 12, a fuel cell stack 130 according to a second embodiment of the present disclosure includes a plurality of power generation units 132 that are stacked. The components the same as those of the fuel cell stack 10 according to the first embodiment will be denoted by the same numerals, and detailed description of such components will be omitted.

Each of the power generation units 132 includes a first metal separator 134, a first membrane electrode assembly 136a, a second metal separator 138, a second membrane electrode assembly 136b, and a third metal separator 140.

The solid polymer electrolyte membrane 74 of each of the first membrane electrode assembly 136a and the second membrane electrode assembly 136b has planar dimensions that are larger than those of the cathode electrode 76 and the anode electrode 78. A resin frame portion 142 (frame-shaped resin member) is integrally formed on the outer periphery of the solid polymer electrolyte membrane 74 by, for example, injection molding a resin material. The resin material is, for example, a commodity plastic, an engineering plastic, or a super engineering plastic, or the like.

Manifolds, including a fuel gas inlet manifold, a fuel gas outlet manifold, an oxidant gas inlet manifold, an oxidant gas outlet manifold, a coolant inlet manifold, and a coolant outlet manifold, are formed in outer peripheral portions of the frame portion 142, although they are not illustrated. These manifolds are not formed in the first metal separator 134, the second metal separator 138, and the third metal separator 140. The metal separators 134, 138, and 140 have smaller sizes so that they can be disposed inward from the manifolds.

A first sealing member 144 is integrally formed with the frame portion 142 of the first membrane electrode assembly 136a. The first sealing member 144 includes a first sealing portion 144a that is disposed on a surface thereof facing the first metal separator 134. The first sealing portion 144a is in contact with the first metal separator 134 so as to surround the outer periphery of the first metal separator 134.

The first sealing member 144 further includes a second sealing portion 144b and a third sealing portion 144c that are disposed on a surface thereof facing the second metal separator 138. The second sealing portion 144b is in contact with the second metal separator 138 so at to surround the outer periphery of the second metal separator 138. The third sealing portion 144c is located outward from the outer periphery of the second metal separator 138. The third sealing portion 144c is in contact with the frame portion 142 of an adjacent second membrane electrode assembly 136b.

A second sealing member 146 is integrally formed with the frame portion 142 of the second membrane electrode assembly 136b. The second sealing member 146 includes a first sealing portion 146a and a second sealing portion 146b that are disposed on a surface thereof facing the third metal separator 140. The first sealing portion 146a is in contact with the third metal separator 140 so as to surround the outer periphery of the third metal separator 140. The second sealing portion 146b is located outward from the outer periphery of the third metal separator 140. The second sealing portion 146b is in contact with the first sealing member 144 of the frame portion 142 of an adjacent first membrane electrode assembly 136a.

A first end power generation unit 132a is disposed at one end of the power generation units 132 in the stacking direction. The first end power generation unit 132a includes the third metal separator 140, a second membrane electrode assembly 136b, and the second metal separator 138 that are stacked outward. A second end power generation unit 132b is disposed at the other end of the power generation units 132 in the stacking direction. The second end power generation unit 132b includes a first metal separator 134, a first membrane electrode assembly 136a, and the second metal separator 138 that are stacked outward.

On the second metal separator 138 of the first end power generation unit 132a, the heat insulating layer 98a, the terminal plate 100a, the insulator 102a, and the end plate 104a are stacked outward in the stacking direction. On the second metal separator 138 of the second end power generation unit 132b, the heat insulating layer 98b, the terminal plate 100b, the insulator 102b, and the end plate 104b are stacked outward in the stacking direction.

With the second embodiment, the coolant flowing through the coolant channels 38 can cool the first membrane electrode assemblies 136a and the second membrane electrode assemblies 136b, which are located on both sides of the coolant channels 38, of the power generation units 132, the first end power generation unit 132a, and the second end power generation unit 132b.

Accordingly, the power generation units 132, the first end power generation unit 132a, and the second end power generation unit 132b of the fuel cell stack 130 can be cooled uniformly. Thus, the second embodiment has an advantage in that cooling can be performed under optimal conditions without the need of a dummy cell and with a compact and economical structure, which is the same as that of the first embodiment.

According to an aspect of the present disclosure, a fuel cell stack includes a plurality of power generation units each including a first separator, a first electrolyte electrode assembly, a second separator, a second electrolyte electrode assembly, and a third separator that are stacked in this order, the first electrolyte electrode assembly and the second electrolyte electrode assembly each including an electrolyte and a pair of electrodes sandwiching the electrolyte therebetween. A reactant gas channel through which a predetermined reactant gas flows along a power generation surface is formed in each of a space between the first separator and the first electrolyte electrode assembly, a space between the first electrolyte electrode assembly and the second separator, a space between the second separator and the second electrolyte electrode assembly, and a space between the second electrolyte electrode assembly and the third separator. A coolant channel through which a coolant flows is formed in each of spaces between the power generation units.

An end separator disposed at one end of the power generation units in a stacking direction is the second separator, and an end separator disposed at the other end of the power generation units in the stacking direction is the second separator.

It is preferable that, on each of the end separators, a terminal plate, an insulation plate, and an end plate be stacked outward in the stacking direction.

In the fuel cell stack, a first end power generation unit is disposed at one end of the power generation units in the stacking direction. The first end power generation unit includes the third metal separator, the second membrane electrode assembly, and the second metal separator that are stacked outward. A second end power generation unit is disposed at the other end of the power generation units in the stacking direction. The second end power generation unit includes the first metal separator, the first membrane electrode assembly, and the second metal separator that are stacked outward.

Therefore, a coolant channel is formed between the first end power generation unit and an adjacent power generation unit. A coolant supplied to the coolant channel cools the second membrane electrode assembly of the first end power generation unit and the first membrane electrode assembly of the adjacent power generation unit. A coolant channel is formed between the second end power generation unit and an adjacent power generation unit. A coolant supplied to the coolant channel cools the first membrane electrode assembly of the second end power generation unit and the second membrane electrode assembly of the adjacent power generation unit.

Accordingly, the coolant flowing through these coolant channels can cool the first membrane electrode assemblies and the second membrane electrode assemblies that are located on both sides of the coolant channels. Thus, the power generation units, the first end power generation unit, and the second end power generation unit of the fuel cell stack are cooled uniformly. Therefore, cooling can be performed under optimal conditions without the need of a dummy cell and with a compact and economical structure.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel cell stack comprising:
    a plurality of power generation units stacked in a stacking direction to provide a stacked body and each comprising:
        a first separator;
        a first electrolyte electrode assembly provided on the first separator;
        a second separator provided on the first electrolyte electrode assembly;
        a second electrolyte electrode assembly provided on the second separator, the first electrolyte electrode assembly and the second electrolyte electrode assembly each including an electrolyte and a pair of electrodes sandwiching the electrolyte therebetween; and
        a third separator provided on the second electrolyte electrode assembly;
    a reactant gas channel through which a reactant gas is to flow along a power generation surface and which is provided between the first separator and the first electrolyte electrode assembly, between the first electrolyte electrode assembly and the second separator, between the second separator and the second electrolyte electrode assembly, and between the second electrolyte electrode assembly and the third separator;
    a coolant channel which is provided between the plurality of power generation units and through which a coolant is to flow;
    a heat insulating layer;
    a terminal plate;
    an insulation plate having a recessed portion; and
    a first additional second separator at one end of the stacked body and a second additional second separator at another end opposite to the one end of the stacked body in the stacking direction, the first additional second separator at the one end and the second additional second separator at the another end having the same structure and orientation,
    wherein a metal portion of the first additional second separator at the one end is in direct contact with the heat insulating layer, and
    wherein the heat insulating layer and the terminal plate are separate and independent components disposed within the recessed portion.

2. The fuel cell stack according to claim 1,
    wherein, on each of the first and second additional second separators, the terminal plate and an end plate are stacked outward in the stacking direction.

3. The fuel cell stack according to claim 1, further comprising:
an end plate,
wherein the terminal plate is provided on the heat insulating layer, the insulation plate is provided on the terminal plate, and the end plate is provided on the insulation plate.

4. The fuel cell stack according to claim 1, further comprising:
a first end power generation unit disposed at the one end; and
a second end power generation unit disposed at the another end,
wherein the first end power generation unit and the second end power generation unit include the first and second additional second separators, respectively, the first and second additional second separators being disposed at respective outer ends of the first end power generation unit and the second end power generation unit in the stacking direction.

5. The fuel cell stack according to claim 1, further comprising:
a second heat insulating layer; and
a second insulation plate,
wherein a metal portion of the second additional second separator at the another end is in direct contact with the second heat insulating layer.

6. A fuel cell stack comprising:
a plurality of power generation units stacked in a stacking direction to provide a stacked body and each comprising:
a first separator;
a first electrolyte electrode assembly provided on the first separator;
a second separator provided on the first electrolyte electrode assembly;
a second electrolyte electrode assembly provided on the second separator, the first electrolyte electrode assembly and the second electrolyte electrode assembly each including an electrolyte and a pair of electrodes sandwiching the electrolyte therebetween; and
a third separator provided on the second electrolyte electrode assembly;
a reactant gas channel through which a reactant gas is to flow along a power generation surface and which is provided between the first separator and the first electrolyte electrode assembly, between the first electrolyte electrode assembly and the second separator, between the second separator and the second electrolyte electrode assembly, and between the second electrolyte electrode assembly and the third separator;
a coolant channel which is provided between the plurality of power generation units and through which a coolant is to flow;
a first heat insulating layer;
a first terminal plate;
a first insulation plate having a recessed portion;
a second heat insulating layer;
a second terminal plate; and
a second insulation plate having a recessed portion,
wherein the first heat insulating layer is in direct contact with a metal portion of a first additional second separator at one end of the stacked body and the second heat insulating layer is in direct contact with a metal portion of a second additional second separator at another end of the stacked body, the first additional second separator at the one end and the second additional second separator at the another end having the same structure and orientation,
wherein the first heat insulating layer and the first terminal plate are separate and independent components disposed within the recessed portion of the first insulation plate, and
wherein the second heat insulating layer and the second terminal plate are separate and independent components disposed within the recessed portion of the second insulation plate.

7. The fuel cell stack according to claim 6,
wherein, on each of the first and second additional second separators, a respective terminal plate, a respective insulation plate, and a respective end plate is stacked outward in the stacking direction.

8. The fuel cell stack according to claim 6, further comprising:
a first end plate; and
a second end plate,
wherein the terminal plates are provided on the respective first and second heat insulating layers, the insulation plates are provided on the respective terminal plates, and the end plates are provided on the respective insulation plates.

9. The fuel cell stack according to claim 7, further comprising:
a first end power generation unit disposed at the one end of the stacked body; and
a second end power generation unit disposed at the another end of the stacked body, the another end being opposite to the one end of the stacked body in the stacking direction,
wherein the first end power generation unit and the second end power generation unit include the first and second additional second separators, respectively, disposed at respective outer ends of the first end power generation unit and the second end power generation unit in the stacking direction.

10. The fuel cell stack according to claim 1, wherein, on the second separator at the one end, the heat insulating layer, the terminal plate, and the insulation plate are stacked, in the order of the heat insulating layer, the terminal plate, and the insulation plate, in the stacking direction.

11. The fuel cell stack according to claim 6, wherein, on the first additional second separator at the one end the first heat insulating layer, the first terminal plate, and the first insulation plate are stacked in the order of the first heat insulating layer, the first terminal plate, and the first insulation plate, in the stacking direction, and
wherein, on the second additional second separator at the another end the second heat insulating layer, the second terminal plate, and the second insulation plate are stacked in the order of the second heat insulating layer, the second terminal plate, and the second insulation plate, in the stacking direction.

12. The fuel cell stack according to claim 1, wherein the heat insulating layer includes a metal material that is separate and independent of the terminal plate.

13. The fuel cell stack according to claim 1, wherein the heat insulating layer is not in direct contact with the insulation plate.

14. The fuel cell stack according to claim 1, wherein the first and second additional second separators at the one end and the another end have the same structure as the structure of the second separators of each of the power generation units.

15. The fuel cell stack according to claim 6, wherein the first and second additional second separators at the one end and the another end have the same structure as the structure of the second separators of each of the power generation units.

16. The fuel cell stack according to claim 1, wherein the first additional second separator is disposed so as to be asymmetrical with respect to the second additional second separator when viewed from a direction orthogonal to the stacking direction.

17. The fuel cell stack according to claim 1,
wherein the first additional second separator is disposed adjacent to one of the first metal separators, the adjacent one of the first metal separators being disposed adjacent to one of the third metal separators,
wherein no other ones of the first separators, second separators, and third separators is disposed between the first additional second separator and the adjacent one of the first metal separators, or between the adjacent one of the first metal separators and the adjacent one of the third metal separators.

18. The fuel cell stack according to claim 1, wherein the second separators have different structures as compared to the first separators and the third separators.

19. The fuel cell stack according to claim 6, wherein the first additional second separator is disposed so as to be asymmetrical with respect to the second additional second separator when viewed from a direction orthogonal to the stacking direction.

20. The fuel cell stack according to claim 6,
wherein the first additional second separator is disposed adjacent to one of the first metal separators, the adjacent one of the first metal separators being disposed adjacent to one of the third metal separators,
wherein no other ones of the first separators, second separators, and third separators is disposed between the first additional second separator and the adjacent one of the first metal separators, or between the adjacent one of the first metal separators and the adjacent one of the third metal separators.

21. The fuel cell stack according to claim 6, wherein the second separators have different structures as compared to the first separators and the third separators.

* * * * *